US012577775B2

(12) United States Patent
Ward et al.

(10) Patent No.: US 12,577,775 B2
(45) Date of Patent: Mar. 17, 2026

(54) PANEL-FORMING PROCESS AND APPARATUS

(71) Applicants:Edward Ward, Castlewellan Down (GB); Paul Rogers, Newcastle Down (GB)

(72) Inventors: Edward Ward, Castlewellan Down (GB); Paul Rogers, Newcastle Down (GB)

( * ) Notice: Subject to any disclaimer, the term of this patent is extended or adjusted under 35 U.S.C. 154(b) by 6 days.

(21) Appl. No.: 18/249,508

(22) PCT Filed: Oct. 11, 2021

(86) PCT No.: PCT/GB2021/052618
§ 371 (c)(1),
(2) Date: Apr. 18, 2023

(87) PCT Pub. No.: WO2022/084647
PCT Pub. Date: Apr. 28, 2022

(65) Prior Publication Data
US 2023/0383530 A1      Nov. 30, 2023

(30) Foreign Application Priority Data

Oct. 19, 2020    (GB) ..................................... 2016531

(51) Int. Cl.
*B32B 37/18* (2006.01)
*B32B 3/04* (2006.01)
(Continued)

(52) U.S. Cl.
CPC ................. *E04B 1/90* (2013.01); *B32B 3/04* (2013.01); *B32B 5/18* (2013.01); *B32B 7/12* (2013.01);
(Continued)

(58) Field of Classification Search
None
See application file for complete search history.

(56) References Cited

U.S. PATENT DOCUMENTS

| | | | | |
|---|---|---|---|---|
| 5,514,238 A | * | 5/1996 | Mauduit | ............... F16B 11/006 |
| | | | | 156/289 |
| 9,476,202 B2 | | 10/2016 | Clancy | |
| 2013/0330492 A1 | * | 12/2013 | Rogers | ....................... C09J 7/21 |
| | | | | 428/40.1 |

FOREIGN PATENT DOCUMENTS

| | | |
|---|---|---|
| DE | 1250767 B | 9/1967 |
| WO | WO94/24493 A1 | 10/1994 |

OTHER PUBLICATIONS

International Search Report and Written Opinion issued in the International Application No. PCT/GB2021/052618.

* cited by examiner

*Primary Examiner* — Daniel McNally
(74) *Attorney, Agent, or Firm* — Foley & Lardner LLP

(57) ABSTRACT

An in-line process for forming a panel having a panel body with a top face and a bottom face and at least two side edges therein between, and having one or more additional edge edgings formed from a compressible material on one or both side edges and fixed to the top and bottom faces of the panel body, the process comprising at least the steps of:
  (i) providing a panel body;
  (ii) providing of one or more additional edgings formed from a compressible material;
  (iii) providing a supply of an edge banding material;
  (iv) locating the one or more additional edgings and the edge banding material to a side edge of the panel body; and (Continued)

(v) fixing the edge banding material to the top and bottom faces of the panel body and encapsulating the at least one of the additional edgings.

9 Claims, 6 Drawing Sheets

(51) Int. Cl.
 *B32B 5/18* (2006.01)
 *B32B 7/12* (2006.01)
 *B32B 37/10* (2006.01)
 *B32B 38/00* (2006.01)
 *E04B 1/90* (2006.01)
 *E04B 1/74* (2006.01)

(52) U.S. Cl.
 CPC .............. *B32B 37/10* (2013.01); *B32B 37/18* (2013.01); *B32B 38/0004* (2013.01); *B32B 2305/022* (2013.01); *B32B 2307/304* (2013.01); *B32B 2307/7375* (2023.05); *B32B 2607/00* (2013.01); *E04B 2001/742* (2013.01)

FIG. 3

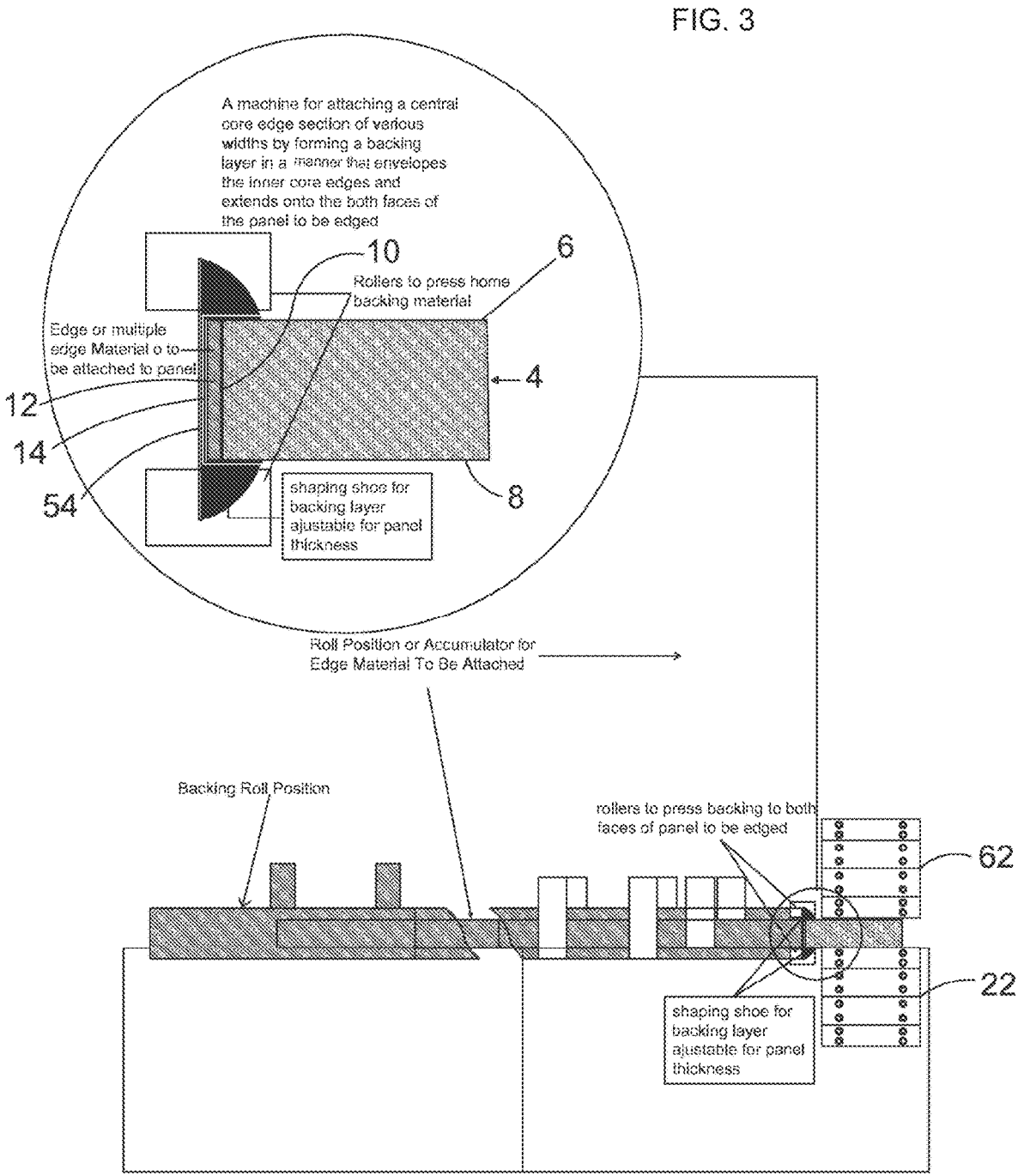

A machine for attaching a central core edge section of various widths by forming a backing layer in a *manner that* envelopes the inner core edges and extends onto the both faces of the panel to be edged

10

6

Rollers to press home backing material

Edge or multiple edge Material o to be attached to panel

12

14

54

4 shaping shoe for backing layer ajustable for panel thickness

8

Roll Position or Accumulator for Edge Material To Be Attached

Backing Roll Position rollers to press backing to both faces of panel to be edged

62

22 shaping shoe for backing layer ajustable for panel thickness

FIG. 6
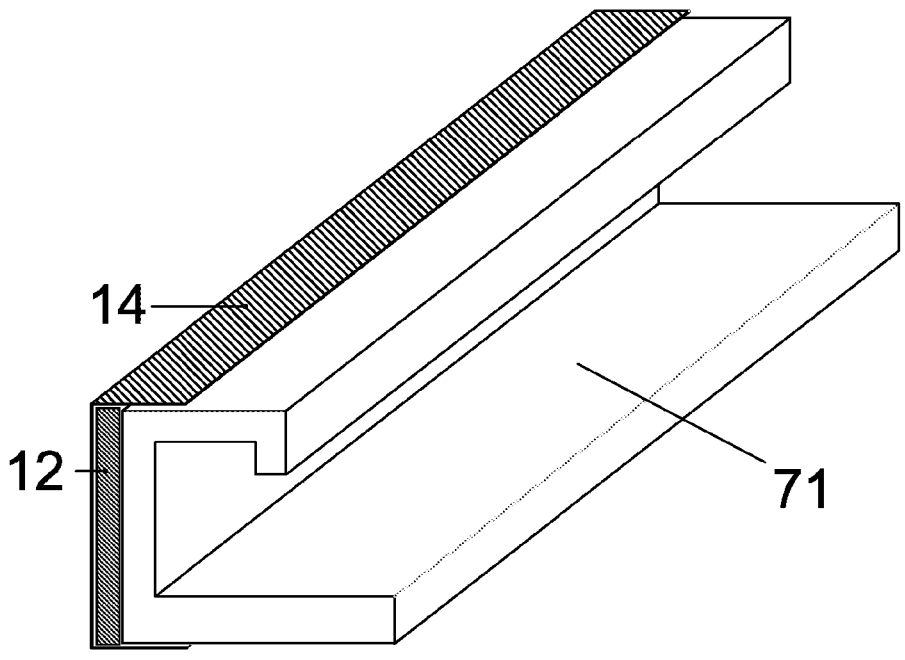
14
12
71
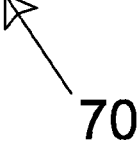
70

PANEL-FORMING PROCESS AND APPARATUS

CROSS-REFERENCE TO RELATED APPLICATIONS

This application claims the benefit of priority to International Application No. PCT/GB2021/052618, filed on Nov. 10, 2021, which claims the benefit of Great Britain Patent Application No. 2016531.2, filed Oct. 19, 2020, each of which are hereby incorporated by reference in their entireties.

The present invention relates to an in-line process for forming a panel, the panel having a panel body and one or more additional edgings formed from a compressible material on one or more side edges and fixed to the top and bottom faces of the panel body, and the so-formed panel. The present invention also relates to an in-line production apparatus for carrying out the process.

Panels for use in building and construction are well known in the art, typically formed as a regular shape, typically rectangular. Examples include insulating panels and thermal panels. Such panels include sandwich panels, sometimes referred to as composite panels or structural panels, which typically consist of two layers of a rigid material bonded to either side of a lightweight core. The three components act together as a composite, and the combination of the components results in better overall performance. The lightweight core keeps the two faces in the correct position, resists shear forces and provides the property of the panel such as insulation, whilst the top and bottom faces provide durability, weather and impact resistance, and resist in-plane forces of tension and compression.

Many building panels are provided in a 'standard' shape and size, typically being rectangular, with a common width dimension of 1200 mm and/or 4 ft. This is to match typically dimensions used by a builder or in a building design; such as locating rafters in a roof with spacing of 1200 mm and/or 4 ft on centre, so that the 'standard' panel is intended to fit snugly thereinbetween.

However, it is possible that other panel spacings are required, or other panel dimensions are specifically required for a particular building or construction, or that the intended 'standard' panel spacings created by a builder are not perfect. As such, it can be possible that using 'standard' width panels results in voids or gaps between the panels and their intended location. Whilst a builder or installer can seek to cut panels to suit the dimensions required for installation, such cuts are typically not 'perfect', and can still leave voids or gaps which then cause drafts, possible water ingress and heat and air loss. These gaps and spaces where structural elements and insulated materials abut, cause heat and air loss routes or mechanisms, which are collectively responsible for the "Performance Gap" which is known in the building industry as the disparity that is found between the energy use predicted and carbon emissions calculated in the design stage of buildings, and the actual energy use of those buildings in operation. In relation to heat loss, the terms 'thermal gap' or 'thermal bypass' are also used to describe the particular heat loss caused by such gaps between insulating panels and the building structure.

One possible solution is disclosed in WO2012/066326A by using a gap sealant tape that can be added by the installer lengthwise along a side of a panel. The user can locate an elongate strip of foam material in a manner that fills a gap or void along an uneven or irregularly shaped panel. The use of a gap filling or sealing tape solves the issue of filling a void or gap 'on site' during installation of the panels, but still requires the tape to be available and to applied to each panel requiring it.

It is an object of the present invention to provide an improved process automated or semi-automated for forming panels.

According to one aspect of the present invention, there is provided an in-line process for forming a panel having a panel body with a top face and a bottom face and at least two side edges thereinbetween, and having one or more additional edge edgings formed from a compressible material on one or more side edges and fixed to the top and bottom faces of the panel body, the process comprising at least the steps of:

(i) providing a panel body;
(ii) providing of one or more additional edgings formed from a compressible material;
(iii) providing a supply of an edge banding material;
(iv) locating the one or more additional edgings and the edge banding material to a side edge of the panel body; and
(v) fixing the edge banding material to the top and bottom faces of the panel body and encapsulating the at least one of the additional edgings.

According to a second aspect of the present invention there is provided a regularly-shaped production-line panel having a panel body with a top face and a bottom face and at least two side edges thereinbetween, wherein one or more side edges include one or more additional edgings formed from a compressible material, said edgings being fixed to the top and bottom faces of the panel body and encapsulating at least one of the additional edgings.

According to another aspect of the present invention, there is provided an in-line production apparatus for forming a panel as defined herein, the apparatus comprising:

a moving panel-table bed;
a supply of the one or more additional edgings formed from a compressible material;
a supply of the edge banding material;
one or more edge locating stations able to locate the one or more additional edgings and the edge banding material onto a side edge of the panel body; and
one or more fixing stations able to fix the edge banding material to the top and bottom faces of the panel body and to encapsulate the at least one of the additional edgings.

It is also an object of the present invention to provide an improved process automated or semi-automated for forming elongate extrusions. Such "extrusions" can be elongated structural elements of wood, metal, plastics and/or composite, and can include but are not limited to studs, frames for windows, frames for doors, and frames for glazing systems, and the like.

Thus, according to another aspect of the present invention, there is provided an in-line process for forming an elongate extrusion having a top face and a bottom face and at least a side edge thereinbetween, and having one or more additional edge edgings formed from a compressible material on the side edge and fixed to the top and bottom faces, the process comprising at least the steps of:

(i) providing an elongate extrusion;
(ii) providing of one or more additional edgings formed from a compressible material;
(iii) providing a supply of an edge banding material;
(iv) locating the one or more additional edgings and the edge banding material to a side edge of the elongate extrusion; and (v) fixing the edge banding material to the top and bottom faces of the elongate extrusion and encapsulating the at least one of the additional edgings.

According to another aspect of the present invention there is provided a regularly-shaped production-line elongate extrusion having a top face and a bottom face and a side edge thereinbetween, wherein the side edge include one or more additional edgings formed from a compressible material, said edgings being fixed to the top and bottom faces and encapsulating the at least one of the additional edgings.

According to another aspect of the present invention, there is provided an in-line production apparatus for forming an elongate extrusion as defined herein, the apparatus comprising:

a moving panel-table bed;

a supply of the one or more additional edgings formed from a compressible material;

a supply of the edge banding material;

one or more edge locating stations able to locate the one or more additional edgings and the edge banding material onto a side edge of the elongate extrusion; and one or more fixing stations able to fix the edge banding material to the top and bottom faces of the elongate extrusion and to encapsulate the at least one of the additional edgings.

Examples of the present invention will now be described by way of example only and with reference only to the accompanying drawings in which:

FIG. 3 is a top view of additional apparatus according to a further embodiment of the present invention;

Figure 1:
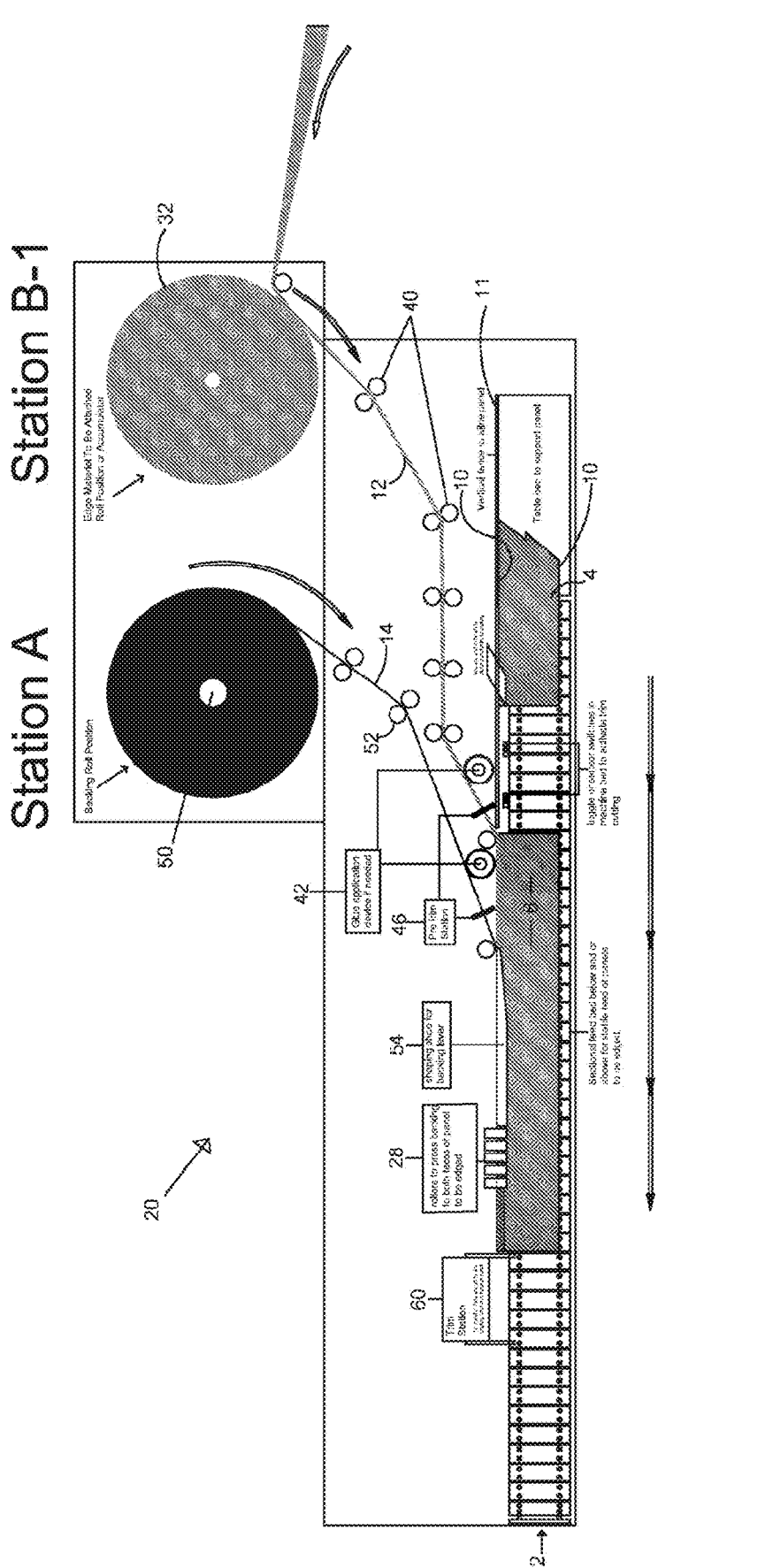
FIG. 1 is a top view of an in-line process performing a panel according to one embodiment of the present invention.

The present invention relates to an in-line process for forming a panel having a panel body with a top face and a bottom face and at least two side edges therein between, and having one or more additional edge edgings formed from a compressible material on one or more side edges and fixed to the top and bottom faces of the panel body, the process comprising at least the steps of:

(i) providing a panel body;

(ii) providing of one or more additional edgings formed from a compressible material;

(iii) providing a supply of an edge banding material;

(iv) locating the one or more additional edgings and the edge banding material to a side edge of the panel body; and (v) fixing the edge banding material to the top and bottom faces of the panel body and encapsulating at least one of the additional edgings.

The term "panel" as used herein includes any structural building element having at least one side edge and top and bottom faces being wholly or substantially parallel near the edges of the panel and intended to located, optionally fixed, between at least one, optionally two, other building elements. The term "panel" as used includes but is not limited to structural panels, windows, doors, roof lights, composite panels, expanded polystyrene panels, The panel may be any panel generally provided in a regular shape, such as being at least elongate, and typically rectangular. Panels providable by the present invention can include sandwich panels, composite panels, SIP panels structural panels, as well as SIP jointing splines, rigid insulation panels and polystyrene panels. The panels also include insulating panels, but not limited to insulating panels for use in the building and construction industry, and intended to provide one or more particular properties such as insulation, water ingress reduction, acoustic or thermal insulation. The panels may be useable with structures such as walls, floors, boards, joists, studs, ceilings, lintels and window frames and door frames.

In one embodiment of the present invention, the panel body is a composite panel, typically also a rigid panel. Composite panels are typically formed of outer layers of a harder or more rigid material, as top and bottom faces, bonded to either side of a core, typically a lightweight or less rigid or hard core, intended to provide at least a majority of the panel's properties such as insulation. The components act together as a composite, with generally the outer rigid materials forming faces which provide durability, weather and impact resistance, radiant barrier, whilst the core provides the intended property as well as ensuring that the faces are in the correct positions and resisting shear forces.

Building insulation panels are well known in the art, and provide an example of a suitable panel body usable in the process and apparatus of the present invention.

Optionally, the panel body has a composite structure having a top face and a bottom face and a core thereinbetween, and wherein the top face or the bottom face or both faces are not flush with a side edge of the core. In this way, the one or more additional edgings may be 'within' the definition of the top and bottom faces, or 'without' the top and bottom faces.

Optionally, the panel body has at least a solid side edge, or solid side edges. That is, whilst the core material of the panel body may be formed of any suitable material or materials, at least the edges of the core have some degree of 'solidity' to which one or more additional edgings can be applied.

In the present invention, it is intended to provide a panel body with a top face and a bottom face and at least two side edges thereinbetween. It is possible for the panel body useable in the present invention to be wholly or substantially a panel known in the art, such as an insulation panel, which can be formed in a manner known in the art and not further described herein.

The process of the present invention is for forming a regularly-shaped production-line panel having a panel body with a top face and a bottom face and at least two side edges thereinbetween, wherein one or both side edges include one or more additional edgings formed from a compressible material, said edgings being fixed to the top and bottom faces of the panel body and encapsulating in the manner of an edge band at least one of the additional edgings in forming the panel.

The dimensions of the panel body and the dimensions of the one or more additional edgings are not limited by the present invention. The present invention provides the ability to edge band different dimensions of a panel body, in particular different depths and lengths, such that the process can be tuned to match a particular order, such as a batch order for a particularly shaped panel.

Optionally, the so-formed panel has a width between the side edges in the range 50-2500 mm, optionally being in the range 200 mm to 2440 mm width.

Optionally, the so-formed panel has a depth between the top and bottom faces in the range of 10-300 mm, optionally in the range 10-200 mm.

The present invention is not limited by the dimensions of the so-formed panel.

Indeed, the present invention can provide panels of a desired width and depth (and length), such that the process and apparatus of the present invention can provide panels 'made to order'. In this way, a builder or installer can have panels of particular dimensions formed by the process and apparatus of the present invention to suit the dimensions of the relevant part of the building or structure being formed. Thus, the present invention can provide panels of bespoke dimensions ready to fit a structure requiring panels of such dimensions in advance.

Optionally, the panel body has a composite structure having a top face and a bottom face and a core therein between, and wherein the top face or the bottom face or both faces are not flush with a side edge of the core.

The additional edging(s) may be formed of one or more materials able to provide one or more properties. Such properties include thermal insulation, preventing water ingress, preventing drafts, etc. Such edgings are therefore insulating, draft-proof, damp proof, etc. strips.

At least one material of one additional edging is compressible, typically compressible by an extensive amount relative to its uncompressed state. One such material is a foam. Foam materials are well known in the art for being compressible, and intended to provide tension where the relaxation of compression is not fully allowed back to its pre-compressed state.

Other suitable materials for the additional edgings include intumescent strips, acoustic materials and expandable foams, materials with a fire-retardant property, materials with a moisture repellent property, materials with insect repellent property, and materials with anti-fungal properties.

Typically, an additional edging comprises foam.

The additional edging(s) may have any suitable dimensions, in particular depth or width, in relation to the width of the panel body. A relatively 'thin' foam or a relatively' thick' foam can be used, depending upon the requirements of the user.

Optionally, one or more further layers may be added (by adhesive or mechanical fixing means) as part of the process onto the outside edge banding material once located on the panel body, to provide a panel not only having the additional properties provided by the one or more additional edgings as described herein, but to have one or more further additional properties. Examples include additional acoustic-reducing layers, or expandable materials such as foams, able to be initiated by a 'peel-off' strip or the like upon installation to assist fitting and/or securement of the panel to a structure, and increase the potential heat loss reduction, or damp proof increase.

The edge banding material may be any suitable material able to be formed or folded or both around the one or more additional edgings and located across the top and bottom faces of the panel body without compressing the compressible material. The edge banding material may include foils, typically being plastic and/or metal foils, having the flexibility to be shaped during forming and during fitting or installation of the panel in use, whilst also having a high degree of durability relative to the additional edging material. Flexible metal foils or plastic foils are known in the art, and include cold-forming foils and hot-forming foils. Also included are scrim reinforced aluminium foil faced craft paper and foil faced PVC.

Typically, the additional edgings can be provided from a supply, optionally a continuous supply, or a substantially continuous supply. One common form of supply is a reel. A reel can provide an additional edging in batch form or continuous form from a suitable supply such as an accumulator able to provide a continuous stream of material onto a suitable supply reel or reels, located at a station that is near the intended location of the panel body during the process of the present invention.

In a similar way, the edge forming material can be provided in a batch form or continuous form, typically from a reel, which reel may be supplied by an accumulator able to supply a continuous feed of material to a station located near to the panel body during the process of the present invention.

In this way, the supply of the one or more additional edgings and the edge banding material allow the process of the present invention to be in-line, i.e. able to provide a series of panels by the supply of a series of panel bodies, in an efficient and cost effective manner in order to supply a number of panels in a production process.

The process of the present invention locates the one or more additional edgings and the edge handling material to a side edge of the panel. Typically, the one or more additional edgings are located by one or more mechanisms, typically involving feed guides, vacuum, glue and rollers but not limited thereto, to locate the one or more additional edgings alongside a side edge of the panel body in advance of, typically immediately in advance of, the location of the edge banding material therearound.

Optionally, the one or more additional edgings are equal to or less than the width of the side edge of the panel body, and the edge banding material is greater than the width of the side edge. As such, step (iv) of the process of the present invention further comprises folding the edge banding material over the top and bottom faces of the panel body and around the one or more additional edgings prior to step (v).

Optionally, the edge banding material is fixed to the top and bottom faces of the panel by adhesive. Typical adhesives include glues and the like, optionally cold-forming adhesives or hot-forming adhesives, optionally being pressured or otherwise pressed together so as to increase the adhesive force between the edge banding material and the top and bottom faces of the panel body.

Optionally, adhesive is located either on the edge banding material or the top and bottom faces of the panel body or both.

Optionally, the adhesive is provided by a station located between the locating of the one or more additional edgings next to a side edge of the panel body, and the locating of the edge banding material around the one or more additional edgings and onto the top and bottom faces of the panel body.

Optionally, the present invention includes one or more feed guides, vacuum and rollers to help direct and locate the one or more additional edgings, the edge banding material, and any adhesive, into the correct location along the in-line forming process.

Optionally, the present invention involves one or more shoes able to help form the location and/or position of the one or more additional materials, the edge banding material, or both, during the process of the present invention. Shaping shoes are known in the art, and can assist positioning the edge banding material around the one or more additional edgings, and folding the edges of the edge banding material over the top and bottom faces of the panel bodies.

Optionally, the process further comprises pressing the edge banding material onto the top and bottom faces of the panel body using one or more rollers or pressure shoes to assist fixing the edge banding material onto the top and bottom faces of the panel body.

Optionally, step (v) of the process further comprises the steps of shaping and pressing the edge banding material onto the top and bottom faces of the panel body without compressing the compressible edging material. That is, the pressing is applied only to the top and bottom faces of the panel body, and not to the central part of the edge banding material located against the compressible material.

Alternatively, step (v) of the process may further comprise the steps of shaping and pressing the edge banding material onto the top and bottom faces of the panel body and compressing the compressible edging material at a pre-determined percentage relative to the edge of the panel being processed. For example some compression, such as up to 5% or 10% deformation, of the depth or width of the compressible material can serve to 'pre-load' some compression into the compressible material, which compression can then be used or relaxed when the so-formed panel is used or installed to assist the panel installation.

Optionally, the process is able to shape and gather unfixed additional edge banding material at or near the top and bottom faces of the panel body, such as in a folded or concertina fashion, to allow such unfixed additional edge banding material to extend the size of the edge banding material following the relaxation of any pre-compressed edgings encapsulated by the edge banding material as such edgings return to a fully expanded shape, typically during use or installation.

Optionally, the process of the present invention includes trimming the size and/or shape of the panel formed by the process. The trimming may include reducing the width of the so-formed panel to exact dimensions required for a user, and/or ensuring that the sides of the so-formed panel are wholly or substantially parallel. Trimming can include cutting and/or pressing or other forming, in order to regularise and/or reduce the dimensions of a panel in a manner known in the art.

Optionally, the step of trimming the so-formed insulating panel is after step (v) of the process of the present invention. Optionally, the process is able to trim the additional edging and the edge-banding material to a pre-determined length relative to the ends of the edge of the panel.

Optionally, the process is for forming a composite panel.

Optionally, the process is for forming a panel having a solid side edge or side edges.

The present invention includes a regularly-shaped production-line panel whenever formed by a process as defined herein.

Optionally, the so-formed panel is a composite panel, optionally an insulating panel, and optionally an insulated or insulating composite panel.

Optionally, the so-formed panel has a solid side edge or side edges.

Optionally, the so-formed panel has two or more additional edgings, one being of a compressible material, and at least another being of a material able to provide a particular property such as to prevent water ingress, prevent acoustic ingress, being intumescent, etc.

Optionally in the so-formed panel, the one or more additional edgings are equal to or less than the width of the side edge, and the edge banding material is greater than the width of the side edge, and wherein the edge banding material is folded over the top and bottom faces of the panel body and around one or more of the additional edgings.

Optionally, the edge banding material is secured to the panel body by adhesive.

Optionally, the process comprises providing the panel body at any angle relative to a floor. That is, the process may be provided in a manner that the panel body is parallel to a floor, or perpendicular to the floor, or any angle thereinbetween.

The present invention includes apparatus an in-line production apparatus for forming a panel as defined herein, the apparatus comprising:

a moving panel-table bed;

a supply of the one or more additional edgings formed from a compressible material;

a supply of the edge banding material;

one or more edge locating stations able to locate the one or more additional edgings and the edge banding material onto a side edge of the panel; and one or more fixing stations able to fix the edge banding material to the top and bottom faces of the panel body and to encapsulate the at least one of the additional edgings.

Typically, the moving panel-table bed comprises a conveyor, able to convey a panel body along a production or process line, and typically having the edge location stations and the fixing stations formed on one or both sides of the conveyor.

In one embodiment of the present invention, the conveyor is horizontal to a floor, and the process is carried out along a horizontally relative to the floor. Optionally, the apparatus is able to provide the panel body at an angle to the floor, optionally vertically, so to carry out the process at an angle to the floor, optionally vertically to the floor.

Optionally, the supply of the one or more additional edgings formed from a compressible material includes a material feed-accumulator.

Optionally, the apparatus further comprises an adhesive supply for fixing the edge banding material to the top and bottom faces of the panel body.

Optionally, the apparatus further comprises a shaping shoe able to shape the edge banding material to the top and bottom faces of the panel body and around the one or more additional edgings.

Optionally, the shaping shoe is adjustable in width to allow the apparatus to be adjusted to form panels of different width.

Optionally, the shaping shoe is adjustable in depth or in distance from a side edge of the panel body, so as to allow different additional edgings to be fixed to a panel body, or different shaped edgings to be added, etc.

Optionally, the shaping shoe can form and deliver the banding material at a selected distance from a side edge of the panel body to encompass the additional edging material at any degree of compression.

Optionally, the apparatus further comprises one or more pressing stations to press the edge banding material to the top and bottom faces of the panel body.

Optionally, the apparatus is able to shape and press the edge banding material onto the top and bottom faces of the panel body without compressing the compressible edging material.

Alternatively, the apparatus may be able to shape and press the edge banding material onto the top and bottom faces of the panel body whilst compressing the compressible edging material at a pre-determined percentage relative to the edge being processed of the panel.

Optionally, the apparatus is able to trim the so-formed panel after step (v). Such trimming may include being able to trim the additional edging and the edge-banding material to a pre-determined length relative to the ends of the edge of the panel.

Optionally, the apparatus is able to shape and gather additional and unfixed edge banding material as to create a folded or concertina of said material at or near the top and bottom faces of the panel body to help accommodate the expansion of any pre-compressed edgings encapsulated by the edge banding material in subsequent use or installation.

Optionally, the apparatus further comprises one or more adhesive stations able to supply adhesive to the edge banding material, and optionally to the top and bottom faces of the panel body.

Optionally, the apparatus further comprises;
    a supply of the one or more additional edgings formed from a compressible or expandable material;
    a supply of the edge banding material;
    one or more edge locating stations able to locate the one or more additional edgings and the edge banding material onto a side edge of the panel body; and
    one or more fixing stations able to fix the edge banding material to the top and bottom faces of the panel body;
    on each side of the panel. As such, the apparatus can produce additional edgings on either or both sides of a panel body. Optionally, the apparatus is formed as a mirror twin of itself and mounted in an adjustable parallel configuration to edge two parallel edges of a panel body simultaneously.

Optionally, the apparatus of the present invention is for forming a composite panel, including adding an edge detail to an existing composite panel, such as an insulating composite panel.

The present invention also relates to an in-line process for forming an elongate extrusion having a top face and a bottom face and at least a side edge thereinbetween, and having one or more additional edge edgings formed from a compressible material on the side edge and fixed to the top and bottom faces, the process comprising at least the steps of:
    (i) providing an elongate extrusion;
    (ii) providing of one or more additional edgings formed from a compressible material;
    (iii) providing a supply of an edge banding material;
    (iv) locating the one or more additional edgings and the edge banding material to a side edge of the elongate extrusion; and
    (v) fixing the edge banding material to the top and bottom faces of the elongate extrusion and encapsulating the at least one of the additional edgings.

The present invention also relates to a regularly-shaped production-line elongate extrusion having a top face and a bottom face and a side edge thereinbetween, wherein the side edge include one or more additional edgings formed from a compressible material, said edgings being fixed to the top and bottom faces and encapsulating the at least one of the additional edgings.

The present invention also relates to an in-line production apparatus for forming an elongate extrusion as defined herein, the apparatus comprising:
    a moving panel-table bed;
    a supply of the one or more additional edgings formed from a compressible material;
    a supply of the edge banding material;
    one or more edge locating stations able to locate the one or more additional edgings and the edge banding material onto a side edge of the elongate extrusion; and one or more fixing stations able to fix the edge banding material to the top and bottom faces of the elongate extrusion and to encapsulate the at least one of the additional edgings.

The term 'elongate extrusion' as used herein relates to extrusions that have a rigid side or edge with typically perpendicular top and bottom edges extending therefrom, typically to form at a 'C'-shaped section, or at least to provide a 'C' shaped profile able to be used in the present invention. The term 'elongate extrusion' includes but is not limited to window frame extrusions, door frame extrusions.

The skilled reader can see how the process and apparatus of the present invention can be used to provide one or more additional edgings to a side or edge of an extruded extrusion in the same way as described herein in relation to panels, wherein the elongate extrusion is provided to one or more additional edgings and edge banding material in the same manner to provide a finished extrusion having one or more additional edgings fixed and encapsulated thereon ready for use and installation in the same manner as described herein in relation to panels.

The skilled reader can see that many of the embodiments of the present invention described herein in relation to panels can be applied to the process, extrusion and apparatus described hereinabove, including but not limited to:
    wherein the one or more additional edgings are equal to or less than the width of the side edge, and the edge banding material is greater than the width of the side edge, and wherein step (iv) further comprises folding the edge banding material over the top and bottom faces and around the one or more additional edgings prior to step (v);
    wherein the edge banding material is fixed to the top and bottom faces by adhesive;
    wherein step (v) further comprises the steps of shaping and pressing the edge banding material onto the top and bottom faces without compressing the compressible edging material;
    wherein step (v) further comprises the steps of shaping and pressing the edge banding material onto the top and bottom faces and compressing the compressible edging material at a pre-determined percentage relative to the edge being processed;
    further comprising the step of trimming the so-formed extrusion after step (v);
    able to trim the additional edging and the edge-banding material to a pre-determined length relative to the ends of the edge of the extrusion;
    wherein the compressible material is a foam.

The term "elongate extrusion" can be elongated structural elements of wood, metal, plastics and/or composite, and can include but are not limited to studs, frames for windows, frames for doors, and frames for glazing systems, and the like.

Figure 2:
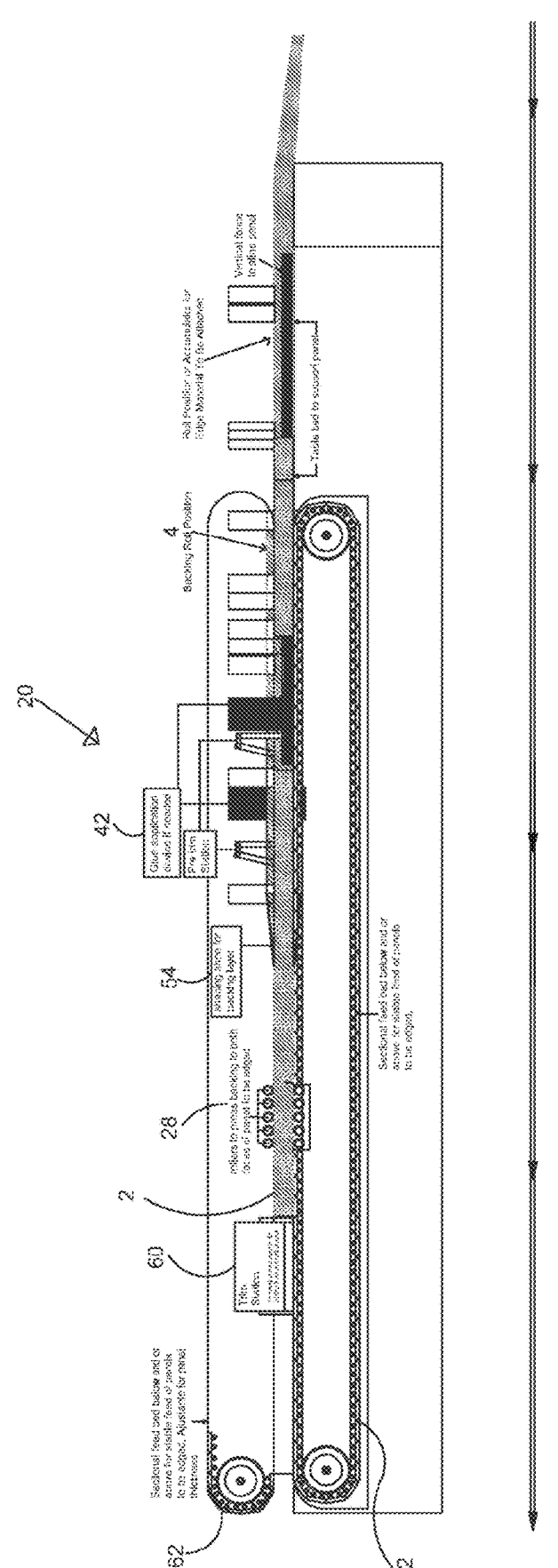
FIG. 2 is a side view of the process and apparatus of FIG. 1.
Figure 4:
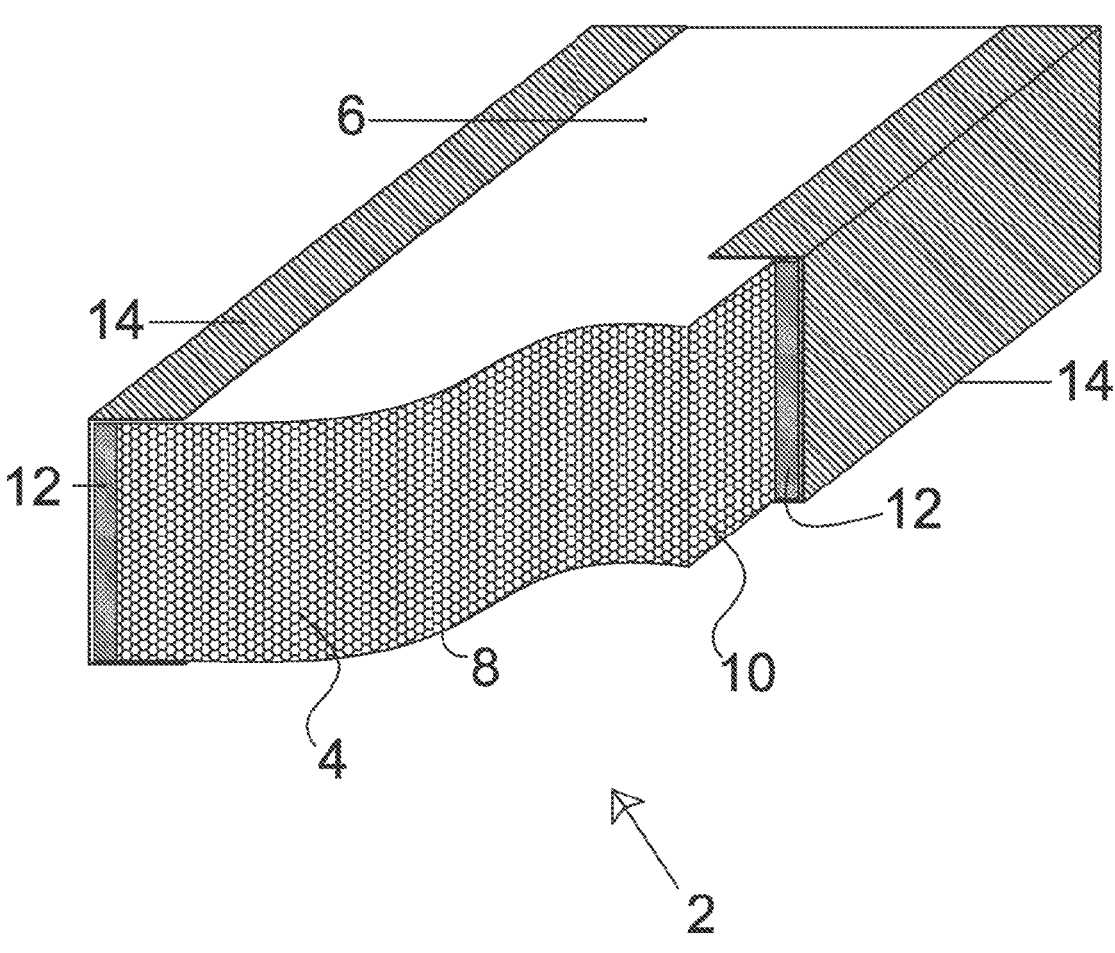
FIG. 4 is a perspective cross-sectional view of a panel according to another embodiment of the present invention.

Referring to the drawings, FIGS. 1, 2 and 4 show an in-line process for forming a panel 2 having a panel body 4 with a top face 6 and a bottom face 8 and at least two side edges 10 thereinbetween, and having one or more additional edge edgings 12 formed from a compressible material on one or more side edges and fixed to the top and bottom faces of the panel body, the process comprising at least the steps of:
    (i) providing a panel body 4;
    (ii) providing of one or more additional edgings 12 formed from a compressible material;
    (iii) providing a supply of an edge banding material 14;

(iv) locating the one or more additional edgings 12 and the edge banding material 14 to a side edge of the panel body 4; and (v) fixing the edge banding material 14 to the top and bottom faces 6, 8 of the panel body 4 and encapsulating at least one of the additional edgings 12.

The in-line and automated process is provided by an apparatus 20 comprising a moving handle-table bed 22, a supply of an additional edging 12 at a first station labelled Station B-1, a supply of the edge banding material 14 from a second station labelled Station A, an edge locating station able to locate the additional edging 12 and the edge banding material 14 onto a side edge 10 of the panel body 4, and a fixing station able to fix the edge banding material 14 to the top and bottom faces 6, 8 of the panel body 2. In the embodiment of the invention shown in the drawings, the fixing is carried out without compressing the compressible material of the additional edging 12.

The conveyor 22 can be a conventional sectional feed bed able to support a panel body 4, and having one or more positions able to locate the panel body 4 such that at least one side 10 of the panel body 4 is available for processing according to the process of the present invention. Optionally, the conveyor is in a vertical position relative to a floor, or at another angle.

The panel body 4 may be a conventional panel in the art, undergoing a process according the present invention to provide a so-formed panel having one or more additional edgings, or may be a panel body particularly formed to provide a so-formed panel according to a particular specification of a purchaser or user. The present invention is not limited by the nature and size of the panel body 4. It is known in the art how to form panels such as composite panels having any suitable height, width and length. The example of the present invention shown in the accompanying drawings is by way of example only, showing a regularly shaped panel body 4 having an elongate shape, and wholly or substantially parallel sides.

FIGS. 1 and 2 show a panel body 4 loaded onto one end of the conveyor 22 against a guide rail 11, with the schematic flow of the conveyor bed 22 being from right to left. FIGS. 1 and 2 show supply of an additional edging 12 from a reel 32 at station Bl.

Figure 5:
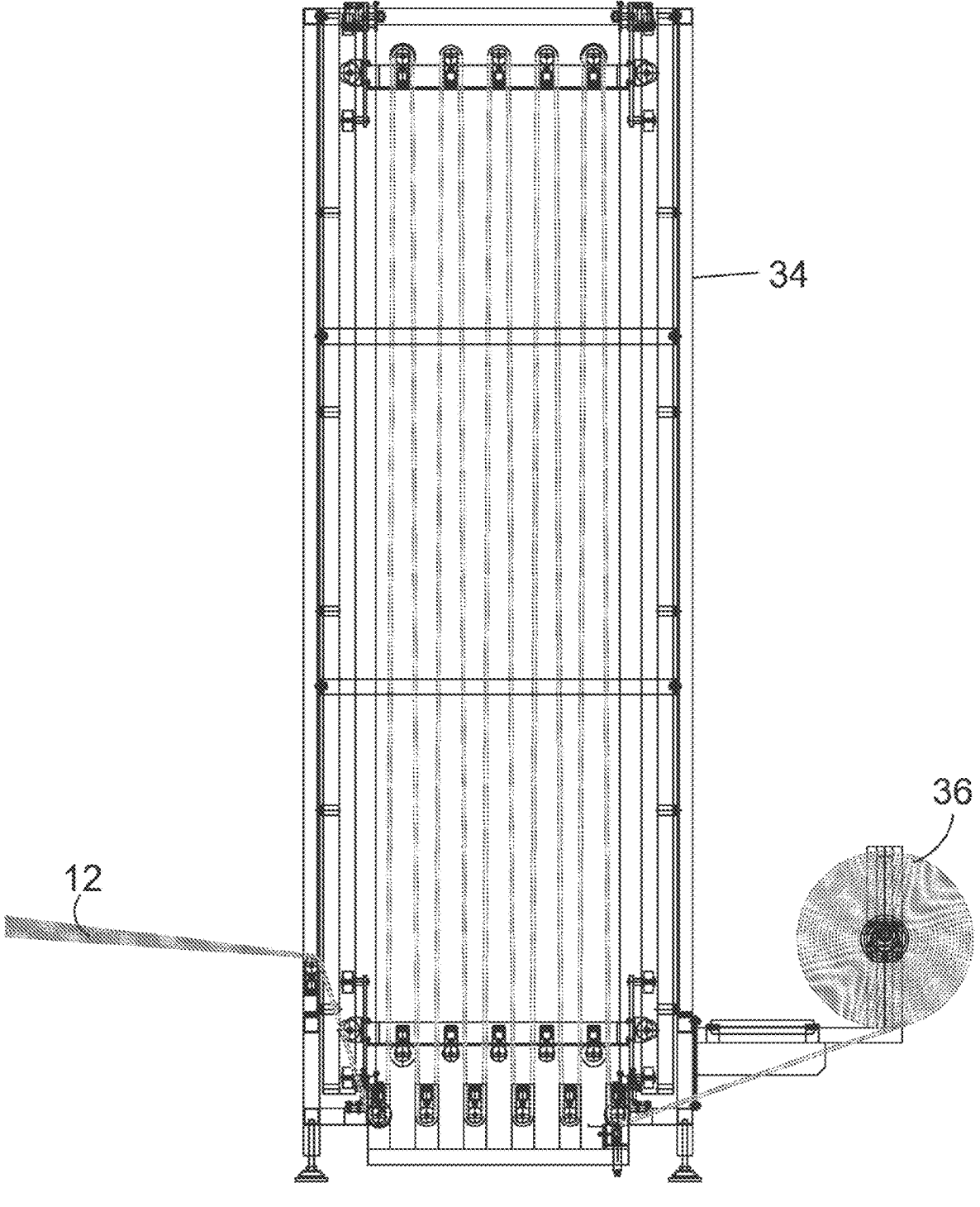
FIG. 5 is a top view of an accumulator useable in the apparatus and process of embodiments of the present invention.

Optionally, the additional edging 12 on reel 32 is supplied from an accumulator 34 shown in FIG. 5, able to provide the additional edging at a regular speed and tension from an earlier supply point 36 based on a serpentine flow path generally around one or more opposing rollers to provide an even speed and tension of the additional material 12.

In FIGS. 1 and 2, the additional material 12 can be supplied through a series of rollers 40 known in the art and over a glue application station 42 to be located alongside a side edge 10 of the panel body 4.

FIGS. 1 and 2 also show a number of trim stations 46 able to trim and/or direct the supply of the additional edging 12 to match the definition of the side edge 10 of each panel body 4. Trim stations with sensors to activate may be added to the feed pathways of the additional edging and banding material at any position on the apparatus.

FIGS. 1 and 2 also show the supply of the edge banding material 14 from a second reel 50. The edge banging material 14 can be supplied to the second reel 50 in the same manner as the supply of additional edging 12 to the first reel 32, using an appropriate accumulator (not shown) acting in the same manner as the accumulator 34 shown in FIG. 5, in order to supply edge banding material 14 to the second reel in an even flow and even tension for subsequent use.

The edge banding material 14 is guided by one or more sets of rollers 52 to be located over the additional edging 12 and to be shaped by a shaping shoe 54 to be folded onto the top and bottom faces 6, 8 of the panel body 4 and thus encapsulate or edge band the additional edging 12. Optionally, the adhesive station 46 may add adhesive to the inside of the edge banding material 14 intended to be located over the top and bottom faces 4, 6 of the panel body 4. Additionally or alternatively, the edge banding material 14 and/or additional edging 12 may already include an adhesive thereon to assist their locating and fixing to the panel body 4. Optionally a glue station may add glue to the top and bottom faces of the panel prior to the banding material being pressed onto the paned face and bottom.

FIG. 1 shows further rollers at a pressing station 28 able to press or otherwise pressurise the edge banding material 14 onto the top and bottom faces 6, 8 of the panel body without compressing the compressible material of the additional edging 12, so as to fix the edge banding material 14 to the top and bottom faces 6, 8 of the panel body 4 and form the panel 2 of the present invention, which is then available at the end of the conveyor belt 22.

Optionally, there are one or more final trim stations 60 able to trim one or more dimensions of the so-formed panel, such as the width but not limited thereto, to ensure that the final so-formed panel has the dimensions desired by the subsequent user.

The apparatus 20 of the present invention can be adjusted to provide panels 2 of any suitable width, height or length, and to provide one or more additional edgings either of the same material or of a different material at different stations, such as being stations B-2, B-3, etc.

Optionally, the parts of the apparatus 20 shown in FIGS. 1 and 2 can be located on the other side of a panel body, and/or on both sides of a panel body, in order to provide additional material onto the sides of a panel body either alternately or in combination or simultaneously.

Optionally, the apparatus 20 can be operated at 90°, such that the panel body is in a relatively vertical position compared to the relative horizontal position shown in FIGS. 1 and 2, but wherein the additional edging and edge banding materials are supplied to be positioned on the panel body in the same relative arrangement as described herein above.

The present invention provides a process and apparatus that is able to envelope one or more additional edgings, in particular having a wider backing layer to allow the edge banding material to be shaped over the two faces of the panel body, and to be edged and glued and pressed into permanent position on the panel body by way of shaping shoes and rollers.

Optionally, FIG. 2 shows an additional feed bed 62 located above the panel body 4, to increase the positional accuracy of the panel body during the process of the present invention.

FIG. 3 shows a cross-sectional view of part of the apparatus 20 shown in FIG. 2, in particular the shaping shoe 54 able to shape the position of the edge banding material 14 around the additional edging 12 on the side 10 of a panel body 4. The shaping shoe 54 may be adjustable so as to attach the same or different edge backing materials 14 to different panel bodies, such as various heights and/or widths of a panel body, in a manner that still envelopes the inner core edges and extends on to the faces of the panel body to be edged.

FIG. 3 shows a side view of the apparatus 20 show in FIG. 2 with top and bottom feed beds 22, 62 and a panel body 4 thereinbetween, with an expanded portion showing a shaping shoe 54 from a side and cross-sectional perspective alongside the panel body 4. FIG. 3 shows the location of the additional edging 12 next to a side edge 10 of the panel body 4, and then the edge banding material 14 being shaped therearound by the shaping shoe 54, including folding the outer ends of the edge banding material 14 over and next to the top and bottom faces 6, 8 of the panel body to form a 'U' section.

FIG. 4 shows a perspective cross-sectional view of a panel 2 formed by the present invention and being an embodiment of the present invention, having an additional edging 12 on both side edges 10 of the panel body 4, with edge banding material 14 covering both additional edgings 12 and fixed to the top and bottom faces 6, 8 of the panel body 4.

The present invention provides a panel having at least one side with an integral edge comprising a compressible material which allows the width of the panel to be compressed during fitting or installation. This allows the panel to be positioned against one or two structural elements, such as rafters, studs, joists walls, floors, ceilings, windows, doors and achieve either a tensioned fit therewith by compression and not full relaxation of the compressible material, or to achieve or enhance a particular property therewith, such as draft prevention, thermal or acoustic insulation, or to achieve both.

The present invention provides an automated or semi-automated process and apparatus for forming such panels. The panels of the present invention can be formed to any suitable size specification, in particular to match a bespoke user specification. The present invention allow a rigid panel body, such as existing panels in the art, to be formed into panels having one or more additional edgings, and therefore one or more additional properties, on one or both or all relevant sides.

The panels of the present invention serve to reduce heat and air loss routes or mechanisms, and help reduce the "Performance Gap" or thermal gap defined hereinabove, without requiring additional work or materials for the user or installer on site, and can provide additional benefits to be pre-installed into building panels that are 'ready to fit'.

The invention claimed is:

1. An in-line process for forming a structural building panel by an in-line production apparatus, the panel having a panel body with a top face and a bottom face and at least two side edges thereinbetween, and having one or more additional edge edgings formed from a compressible material on one or both side edges and fixed to the top and bottom faces of the panel body, the process comprising at least the steps of:

(i) providing a panel body along a moving panel-table bed of the in-line production apparatus;

(ii) providing one or more additional edgings formed from a compressible material;

(iii) guiding, by a plurality of first rollers of the in-line production apparatus, the one or more additional edgings to a side edge of the panel body;

(iv) providing a supply of an edge banding material separately from the one or more additional edgings;

(v) applying adhesive, via an adhesive station of the in-line production apparatus, to an inside of the edge banding material;

(vi) guiding, by a plurality of second rollers of the in-line production apparatus, the edge banding material to a side edge of the panel body;

(vii) fixing by the adhesive the edge banding material to both the top and bottom faces of the panel body and encapsulating the at least one of the additional edgings; and (viii) shaping and pressing, via a pressing station of the in-line production apparatus, the edge banding material onto the top and bottom faces of the panel body without compressing the one or more additional edgings formed from the compressible material.

2. A process as claimed in claim 1 further comprising the step of trimming the so-formed panel after step (v).

3. A process as claimed in claim 2 able to trim the additional edging and the edge-banding material to a predetermined length relative to the ends of the edge of the panel.

4. A process as claimed in claim 1 for forming a composite panel.

5. A process as claimed in claim 4 for forming an insulated composite panel.

6. A process as claimed in claim 1 wherein the one or more additional edgings are equal to or less than the width of the side edge, and the edge banding material is greater than the width of the side edge, and wherein step (iv) further comprises folding the edge banding material over the top and bottom faces of the panel body and around the one or more additional edgings prior to step (v).

7. A process as claimed in claim 1 for forming a panel having a solid side edge or side edges.

8. A process as claimed in claim 1 comprising providing the panel body at any angle relative to a floor.

9. An in-line process for forming an elongate extrusion by an in-line production apparatus, the elongate extrusion having a top face and a bottom face and at least a side edge thereinbetween, and having one or more additional edge edgings formed from a compressible material on the side edge and fixed to the top and bottom faces, the process comprising at least the steps of:

(i) providing an elongate extrusion along a moving panel-table bed of the in-line production apparatus;

(ii) providing one or more additional edgings formed from a compressible material;

(iii) guiding, by a plurality of first rollers of the in-line production apparatus, the one or more additional edgings to a side edge of the elongate extrusion;

(iv) providing a supply of an edge banding material separately from the one or more additional edgings;

(v) applying adhesive, via an adhesive station of the in-line production apparatus, to an inside of the edge banding material;

(vi) guiding, by a plurality of second rollers of the in-line production apparatus, the edge banding material to a side edge of the elongate extrusion;

(vii) fixing the edge banding material to the top and bottom faces of the elongate extrusion and encapsulating the at least one of the additional edgings; and (viii) shaping and pressing, via a pressing station of the in-line production apparatus, the edge banding material onto the top and bottom faces of the elongate extrusion without compressing the one or more additional edgings formed from the compressible material.

* * * * *